United States Patent
Fischlein et al.

(10) Patent No.: US 8,065,057 B2
(45) Date of Patent: Nov. 22, 2011

(54) PROCESS AND APPARATUS FOR THE SWAY STABILIZATION OF A MOTOR VEHICLE

(75) Inventors: Hartmut Fischlein, Korntal-Münchingen (DE); Robert Ferger-Andrews, Vaihingen/Enz (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 895 days.

(21) Appl. No.: 12/100,816

(22) Filed: Apr. 10, 2008

(65) Prior Publication Data

US 2008/0255726 A1     Oct. 16, 2008

(30) Foreign Application Priority Data

Apr. 12, 2007  (DE) .................... 10 2007 017 245

(51) Int. Cl.
*B60G 17/016*     (2006.01)
(52) U.S. Cl. .......................................................... 701/38
(58) Field of Classification Search ............... 701/1–124; 368/124–183, 324–326; 301/5.1–5.22
See application file for complete search history.

(56) References Cited

U.S. PATENT DOCUMENTS

| | | | |
|---|---|---|---|
| 5,144,558 A | 9/1992 | Fukushima et al. | |
| 5,384,705 A | 1/1995 | Inagaki et al. | |
| 6,175,792 B1 | 1/2001 | Jones et al. | |
| 6,282,471 B1 | 8/2001 | Burdock et al. | |
| 6,397,134 B1 | 5/2002 | Shal et al. | |
| 6,687,594 B1 | 2/2004 | Shafiyha et al. | |
| 6,842,683 B2 | 1/2005 | Kim | |
| 7,418,325 B2 | 8/2008 | Yamada et al. | |
| 2001/0021885 A1 | 9/2001 | Schulke et al. | |
| 2003/0163237 A1 | 8/2003 | Kim | |
| 2004/0176890 A1 | 9/2004 | Acker et al. | |
| 2004/0254703 A1* | 12/2004 | Traechtler et al. | 701/38 |
| 2005/0055148 A1 | 3/2005 | Kesselgruber | |
| 2005/0143892 A1* | 6/2005 | Batistic et al. | 701/82 |
| 2005/0192728 A1 | 9/2005 | Yasui et al. | |
| 2006/0116802 A1 | 6/2006 | Yamada et al. | |

FOREIGN PATENT DOCUMENTS

| | | |
|---|---|---|
| DE | 19738826 A1 | 3/1999 |
| EP | 0427909 A1 | 5/1991 |
| EP | 0495371 A2 | 7/1992 |
| EP | 1338490 A2 | 8/2003 |
| EP | 1568521 A2 | 8/2005 |
| EP | 1661740 A1 | 5/2006 |
| JP | 5016633 A | 1/1993 |
| WO | 9964262 A1 | 12/1999 |

OTHER PUBLICATIONS

European Search Report dated Aug. 19, 2009.

* cited by examiner

*Primary Examiner* — Mary Cheung

(57) ABSTRACT

A process for stabilizing the sway of a motor vehicle, in which adjusting signals are generated for actuators associated with a front axis and with a rear axis of the motor vehicle on the basis of a measured or a calculated transverse acceleration of the motor vehicle, which actuators make support moments available on the front axis and/or on the rear axis for stabilizing the sway. Accordingly the measured transverse acceleration and the calculated transverse acceleration are used in at least one speed range of the motor vehicle in such a manner to generate the adjusting signals for the actuators that either the calculated transverse acceleration or the measured transverse acceleration is used to generate the adjusting signals in dependence on an absolute value of the difference between the calculated transverse acceleration of the motor vehicle and the measured transverse acceleration of the motor vehicle.

12 Claims, 2 Drawing Sheets

PROCESS AND APPARATUS FOR THE SWAY STABILIZATION OF A MOTOR VEHICLE

CROSS-REFERENCE TO RELATED APPLICATION

This application claims the priority, under 35 U.S.C. §119, of German application DE 10 2007 017 245.3, filed Apr. 12, 2007; the prior application is herewith incorporated by reference in its entirety.

BACKGROUND OF THE INVENTION

Field of the Invention

The invention relates to a process for the sway stabilization of a motor vehicle in which adjusting signals for actuators associated with a front axis and/or a rear axis of the motor vehicle are generated on the basis of a measured transverse acceleration or a calculated transverse acceleration of the motor vehicle. The actuators make support moments available on the front axis and/or on the rear axis for sway stabilization. Furthermore, the invention relates to an apparatus for the sway stabilization of a motor vehicle which contains a device for measuring or calculating a transverse acceleration of the motor vehicle, and a control or regulating apparatus that generates adjusting signals for actuators associated with a front axis and with a rear axis of the motor vehicle on the basis of the measured or calculated transverse acceleration. The actuators make support moments available on the front axis and/or on the rear axis for stabilizing the sway.

The driving behavior of a motor vehicle is determined by a plurality of forces and moments that act in the direction of motor vehicle axes, namely, in the direction of a longitudinal axis, a transverse axis, a vertical axis and a sway axis on the motor vehicle. The term sway axis denotes an axis extending through the sway centers of the front axis and of the rear axis of the motor vehicle. A rolling movement of the motor vehicle about the sway axis is designated as sway.

In order to make good driving behavior of a motor vehicle available a sway stabilization in a motor vehicle is already known from the state of the art in which during a sway stabilization based on the vehicle state, characterized by, e.g., a measured transverse acceleration of the motor vehicle or by a calculated transverse acceleration of the motor vehicle, adjusting signals are generated for actuators that are associated with the front axis and the rear axis of the motor vehicle and that make supporting moments available on the front axis and/or on the rear axis for stabilizing the sway. The actuators are typically hydraulically adjustable stabilizers that can be controlled by valve blocks. The valve blocks receive their adjusting signals from a control or regulating apparatus that generates, among other things, the adjusting signals based on the measured or calculated transverse acceleration of the motor vehicle.

As already explained, in sway stabilizations known from the state of the art either the measured transverse acceleration or the calculated transverse acceleration of the motor vehicle is used to generate adjusting signals for actuators. The measured transverse acceleration contains components of sway movements as well as of transverse movements of the vehicle construction based on road input as well as on curve travel. The calculated transverse acceleration takes into account, e.g., during curve travel only components given by the driver, e.g., based on the steering angle, and is therefore better suited for reasons of comfort as an input magnitude for a stabilization of sway than the measured transverse acceleration.

However, a calculated transverse acceleration cannot be calculated with sufficient precision in all states of a motor vehicle, for which reason the measured transverse acceleration is customarily used as input magnitude for the stabilization of sway.

BRIEF SUMMARY OF THE INVENTION

It is accordingly an object of the invention to provide a process and an apparatus for the sway stabilization of a motor vehicle that overcomes the above-mentioned disadvantages of the prior art devices of this general type, which provides a novel process as well as a novel apparatus for stabilizing the sway of a motor vehicle.

With the foregoing and other objects in view there is provided, in accordance with the invention, a process for stabilizing sway in a motor vehicle. The process includes the steps of: generating adjusting signals for actuators associated with a front axis and/or a rear axis of the motor vehicle on a basis of a measured transverse acceleration or a calculated transverse acceleration of the motor vehicle, the actuators making support moments available on the front axis and the rear axis for sway stabilization; and using the measured transverse acceleration and the calculated transverse acceleration in at least one speed range of the motor vehicle for generating the adjusting signals for the actuators and either the calculated transverse acceleration or the measured transverse acceleration is used to generate the adjusting signals in dependence on an absolute value of a difference between the calculated transverse acceleration of the motor vehicle and the measured transverse acceleration of the motor vehicle.

According to the invention the measured transverse acceleration and the calculated transverse acceleration are used in at least one speed range of the motor vehicle in such a manner for generating the adjusting signals for the actuators that either the calculated transverse acceleration or the measured transverse acceleration is used to generate the adjusting signals in dependence on an absolute value of the difference between the calculated transverse acceleration of the motor vehicle and the measured transverse acceleration of the motor vehicle.

The present invention suggests for the first time switching between the measured transverse acceleration and the calculated transverse acceleration as an input magnitude for the stabilizing of sway based on defined criteria. This can improve the stabilizing of sway as regards driving safety and travel comfort. The switching between measured transverse acceleration and calculated transverse acceleration in accordance with the invention as an input magnitude for the stabilizing of sway takes place in at least one defined speed range. Outside of the or of every defined speed range the measured transverse acceleration is used as input magnitude for the stabilizing of sway.

In accordance with an added mode of the invention, there is the step of using the calculated transverse acceleration to generate the adjusting signals if the absolute value of the difference between the calculated transverse acceleration and the measured transverse acceleration is less than a first boundary value.

In accordance with another mode of the invention, there is the step of subsequently using a first fixed transverse acceleration value as a transverse acceleration for generating the adjusting signals if the calculated transverse acceleration is used to generate the adjusting signals and the absolute value of the difference between the calculated transverse acceleration and the measured transverse acceleration exceeds the first boundary value. The first fixed transverse acceleration value corresponds to a value of the calculated transverse acceleration at which the first boundary value is exceeded.

In accordance with an additional mode of the invention, there is the step of subsequently using again the calculated transverse acceleration to generate the adjusting signals if the first fixed transverse acceleration value is used to generate the adjusting signals and the absolute value of the difference between the calculated transverse acceleration and the measured transverse acceleration drops below the first boundary value.

In accordance with a further mode of the invention, there is the step of subsequently using the measured transverse acceleration as the transverse acceleration for generating the adjusting signals if the first fixed transverse acceleration value is used to generate the adjusting signals and an absolute value of the difference between the measured transverse acceleration and the first fixed transverse acceleration value exceeds a second boundary value or drops below a third boundary value.

In accordance with a further added mode of the invention, there is the step of subsequently using again the calculated transverse acceleration to generate the adjusting signals if the measured transverse acceleration is used to generate the adjusting signals and the absolute value of the difference between the measured transverse acceleration and the calculated transverse acceleration drops below the first boundary value.

In accordance with another further mode of the invention, there is the step of subsequently using a second fixed transverse acceleration value as a transverse acceleration for generating the adjusting signals if the measured transverse acceleration is used to generate the adjusting signals and the absolute value of the difference between the measured transverse acceleration and the calculated transverse acceleration drops below the first boundary value. The second fixed transverse acceleration value corresponds to a value of the measured transverse acceleration at which the first boundary value is dropped below.

In accordance with a further added mode of the invention, there is the step of subsequently using again the measured transverse acceleration to generate the adjusting signals if the second fixed transverse acceleration value is used to generate the adjusting signals and the absolute value of the difference between the calculated transverse acceleration and the measured transverse acceleration exceeds the first boundary value.

In accordance with a further additional mode of the invention, there is the step of subsequently using the calculated transverse acceleration as the transverse acceleration for generating the adjusting signals if the second fixed transverse acceleration value is used to generate the adjusting signals and an absolute value of the difference between the calculated transverse acceleration and the second fixed transverse acceleration value exceeds a fourth boundary value or drops below a fifth boundary value.

In accordance with a concomitant mode of the invention, there is the step of using the measured transverse acceleration to generate the adjusting signals for the actuators outside of the or of every speed range of the motor vehicle.

Other features which are considered as characteristic for the invention are set forth in the appended claims.

Although the invention is illustrated and described herein as embodied in a process and an apparatus for the sway stabilization of a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
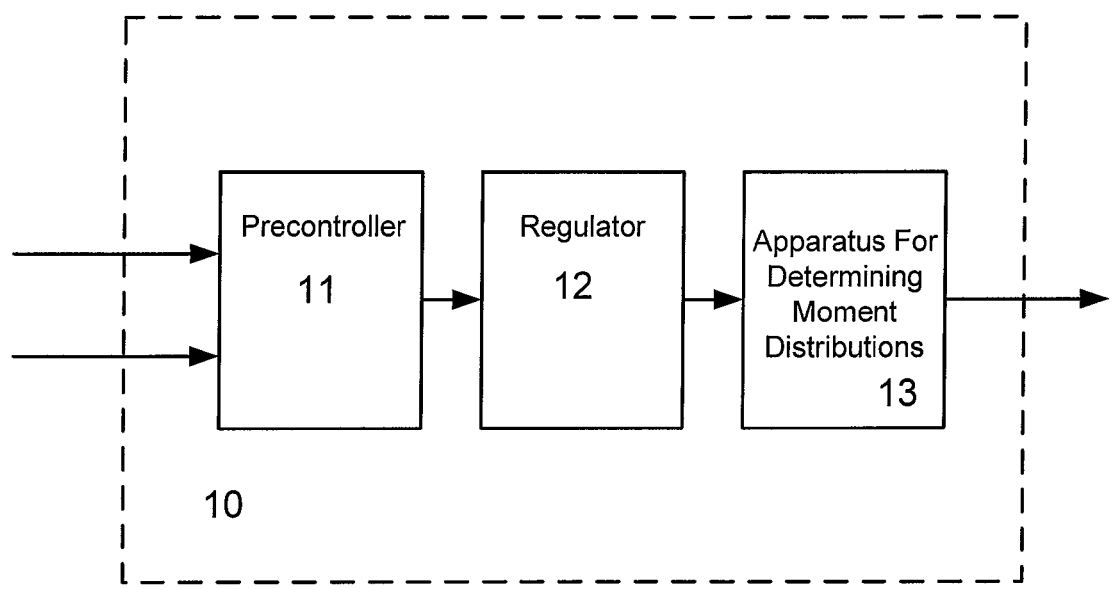
FIG. 1 is a block diagram of an apparatus in accordance with the invention for the stabilizing of sway in a motor vehicle.

Referring now to the figures of the drawing in detail and first, particularly, to FIG. 1 thereof, there is shown an apparatus and a process for stabilizing the sway of a motor vehicle, which term sway denotes a tilting movement of the motor vehicle about a sway axis of the vehicle. The sway axis is an axis that extends through the sway center of the front axis as well as through the sway center of the rear axis of the motor vehicle. A sway center of an axis is the point on an imaginary vertical line in the middle of the axis about which point the vehicle construction begins to rotate under the influence of lateral forces.

An apparatus for sway stabilization contains actuators associated with the front axis and/or rear axis that make support moments for sway stabilization available on the front axis and/or the rear axis, namely, in dependence on a measured transverse acceleration or of a calculated transverse acceleration of the motor vehicle. An apparatus for sway stabilization is preferably configured as a hydraulic system, in which case the actuators associated with the front axis and the rear axis are then configured as hydraulically adjustable stabilizers that can be regulated via valve blocks. Adjusting signals for regulating the valve blocks are made available from a control or regulating apparatus, namely, based on the measured transverse acceleration or the calculated transverse acceleration of the motor vehicle.

FIG. 1 shows a section of an apparatus for sway stabilization, namely, a control or regulating apparatus 10 to which at least the measured transverse acceleration and the calculated transverse acceleration of the motor vehicle are supplied as input magnitudes and which emits adjusting commands as output magnitude for the actuators, in particular for valve blocks of hydraulically adjustable stabilizers. The apparatus for sway stabilization can also be configured, e.g., as an electrical system and contain electrically adjustable stabilizers. The apparatus for sway stabilization can also be configured as an electro-hydraulic system.

According to FIG. 1 the control or regulating apparatus contains three main components, namely, a pre-control apparatus 11, a regulating apparatus 12 and an apparatus 13 for determining a distribution of moment between a support moment available on the front axis and a support moment available on the rear axis.

The pre-control apparatus 11 generates a pre-control component from the measured transverse acceleration or the calculated transverse acceleration of the motor vehicle for sway stabilization, which regulating apparatus 12 corrects imprecise data of the pre-control by a regulation. Based on the pre-control via pre-control apparatus 11 and the regulating via regulating apparatus 12, apparatus 13 determines a distribution of moment between the support moment available on the front axis and the support moment available on the rear axis for stabilizing the sway of the motor vehicle.

The present invention relates to such details of a stabilizing of sway with which it is decided whether the measured transverse acceleration or the calculated transverse acceleration of the motor vehicle is used to generate the adjusting signals for the actuators. Even the use of a mixed or intermediate value is possible. This selection takes place in particular in pre-control apparatus 11 of control or regulating apparatus 10.

In the sense of the process in accordance with the invention the measured transverse acceleration and the calculated transverse acceleration are used in at least one speed range of the motor vehicle in such a manner for generating the adjusting signals for the actuators that either the calculated transverse acceleration or the measured transverse acceleration is used to generate the adjusting signals in dependence on an absolute value of the difference between the calculated transverse acceleration of the motor vehicle and the measured transverse acceleration of the motor vehicle. Outside of the or of every defined speed range the measured transverse acceleration of the motor vehicle was used to generate the adjusting signals.

Preferred exemplary embodiments of the process in accordance with the invention are described in detail in the following with reference made to FIGS. 2 and 3.

Figure 2:
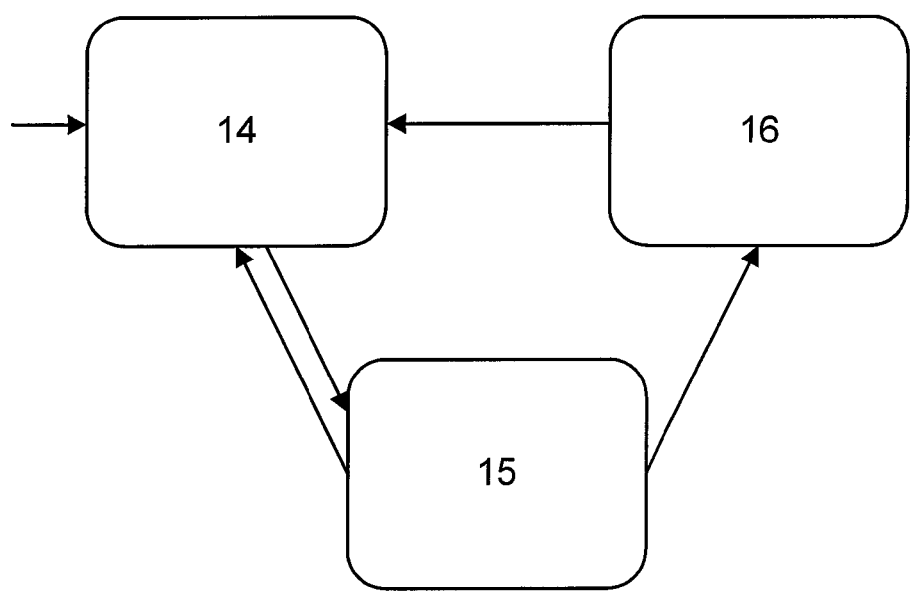
FIG. 2 is a diagram illustrating a process of the invention for stabilizing the sway of a motor vehicle in accordance with a first exemplary embodiment of the invention.

Thus, FIG. 2 shows a first exemplary embodiment of the process in accordance with the invention for sway stabilization that is used when the motor vehicle is operated in the or every defined speed range. Accordingly, if the vehicle travels at a speed inside one of the defined speed ranges, the process shown in FIG. 2 is used. Then, if an absolute value of the difference between the calculated transverse acceleration and the measured transverse acceleration is smaller than a first boundary value inside the or every speed range, the calculated transverse acceleration is used to generate the adjusting signals for the actuators of the sway stabilization. This is shown in FIG. 2 by block 14.

Then, if the calculated transverse acceleration is used according to block 14 to generate the adjusting signals and the absolute value of the difference between the calculated transverse acceleration and the measured transverse acceleration exceeds a first boundary limit, a branch is made starting from block 14 to block 15, in which case a first fixed transverse acceleration value is subsequently used in block 15 as the transverse acceleration for generating the adjusting signals. The first fixed transverse acceleration value corresponds to the value of the calculated transverse acceleration at which the first boundary value is exceeded or was exceeded.

Then, if according to block 16 the first fixed transverse acceleration value for generating the adjusting signals is used and the absolute value of the difference between the calculated transverse acceleration and the measured transverse acceleration drops below the first boundary value, a branch is made from block 15 to block 14, and subsequently the calculated transverse acceleration for generating the adjusting signals is used according to block 14.

Then, on the other hand, if the first fixed transverse acceleration value for generating the adjusting signals is used according to block 15, and an absolute value of the difference between the measured transverse acceleration and the first fixed transverse acceleration value exceeds a second boundary value or drops below a third boundary value, a branch is made from block 15 to block 16 and subsequently the measured transverse acceleration is used in block 16 as a transverse acceleration for generating the adjusting signals. The second boundary value is preferably the first boundary value plus an offset.

Then, if the measured transverse acceleration is used according to block 16 to generate the adjusting signals and the absolute value of the difference between the measured transverse acceleration and the calculated transverse acceleration drops below the first boundary value, a branch is made from block 16 to block 14 and subsequently the calculated transverse acceleration is again used to generate the adjusting signals for the actuators of the stabilizing of sway.

Figure 3:
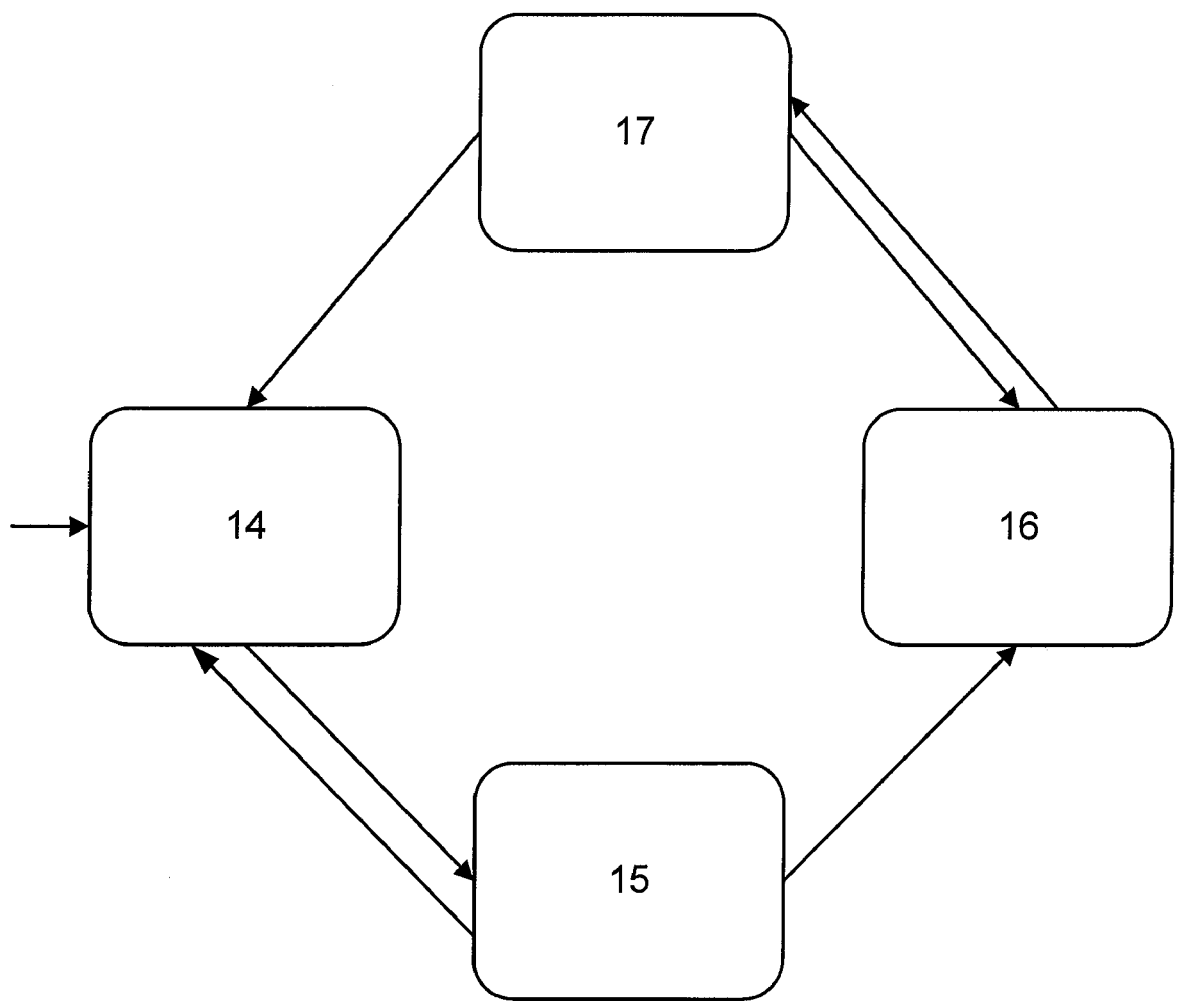
FIG. 3 is a diagram illustrating the process of the invention for stabilizing the sway of a motor vehicle in accordance with a second exemplary embodiment of the invention.

FIG. 3 shows a second exemplary embodiment of the process of the invention for the stabilizing of sway of a motor vehicle. The exemplary embodiment of FIG. 3 is a preferred further development of the exemplary embodiment of FIG. 2.

Therefore, in order to avoid unnecessary repetitions the same reference numerals are used for like blocks. The exemplary embodiment of FIG. 3 differs from the exemplary embodiment of FIG. 2 in that there is no direct branching from block 16 to block 14 but rather only indirectly via a block 17.

Accordingly, in the exemplary embodiment of FIG. 3 when the measured transverse acceleration is used according to block 16 to generate the adjusting signals and the absolute value of the difference between the measured transverse acceleration and the calculated transverse acceleration drops below the first boundary value, no branching to block 14 takes place but rather to block 17, and then a second fixed transverse acceleration value is used as the transverse acceleration for generating the adjusting signals. The second fixed transverse acceleration value corresponds to the value of the measured transverse acceleration at which the first boundary value is dropped below or was dropped below.

Then, if the second fixed transverse acceleration value is used according to block 17 to generate the adjusting signals and the absolute value of the difference between the calculated transverse acceleration and the measured transverse acceleration exceeds the first boundary value, a branch is made starting from block 17 to block 16 and the measured transverse acceleration is subsequently used again to generate the adjusting signals.

Then, on the other hand, if the second fixed transverse acceleration value is used according to block 17 to generate the adjusting signals and an absolute value of the difference between the calculated transverse acceleration and the second fixed transverse acceleration value exceeds a forth boundary value or drops below a fifth boundary value, a branch is made starting from block 17 to block 14 and the calculated transverse acceleration is subsequently used as transverse acceleration for generating the adjusting signals for the actuators of sway stabilization. The fourth boundary value is preferably the first boundary value plus an offset.

Thus, it is in the scope of the process in accordance with the invention to switch between the measured transverse acceleration and the calculated transverse acceleration within at least one defined speed range of the motor vehicle when determining the adjusting signals for the actuators of sway stabilization. Outside of the or of every defined speed range the measured transverse acceleration is used to determine the adjusting signals. Inside the or of every speed range the switching between the calculated transverse acceleration and the measured transverse acceleration takes place on the basis of the absolute difference between the measured transverse acceleration and the calculated transverse acceleration. At least in the direction of switching from the calculated transverse acceleration to the measured transverse acceleration the switching takes place via a fixed intermediate value for the transverse acceleration. In addition, such a fixed intermediate value can also be passed through in the direction of switching from the measured transverse acceleration to the calculated transverse acceleration.

The invention claimed is:

1. A process for stabilizing sway in a motor vehicle, which comprises the steps of:
generating adjusting signals for actuators associated with at least one of a front axis and a rear axis of the motor vehicle on a basis of one of a measured transverse acceleration and a calculated transverse acceleration of the motor vehicle, the actuators making support moments available on the front axis and the rear axis for sway stabilization;
using the measured transverse acceleration and the calculated transverse acceleration in at least one speed range of the motor vehicle for generating the adjusting signals for the actuators and one of the calculated transverse acceleration and the measured transverse acceleration is used to generate the adjusting signals in dependence on an absolute value of a difference between the calculated transverse acceleration of the motor vehicle and the measured transverse acceleration of the motor vehicle; and
using the calculated transverse acceleration to generate the adjusting signals if the absolute value of the difference between the calculated transverse acceleration and the measured transverse acceleration is less than a first boundary value.

2. The process according to claim 1, which further comprises subsequently using a first fixed transverse acceleration value as a transverse acceleration for generating the adjusting signals if the calculated transverse acceleration is used to generate the adjusting signals and the absolute value of the difference between the calculated transverse acceleration and the measured transverse acceleration exceeds the first boundary value.

3. The process according to claim 2, which further comprises setting the first fixed transverse acceleration value to correspond to a value of the calculated transverse acceleration at which the first boundary value is exceeded.

4. The process according to claim 2, which further comprises subsequently using again the calculated transverse acceleration to generate the adjusting signals if the first fixed transverse acceleration value is used to generate the adjusting signals and the absolute value of the difference between the calculated transverse acceleration and the measured transverse acceleration drops below the first boundary value.

5. The process according to claim 2, which further comprises subsequently using the measured transverse acceleration as the transverse acceleration for generating the adjusting signals if the first fixed transverse acceleration value is used to generate the adjusting signals and an absolute value of the difference between the measured transverse acceleration and the first fixed transverse acceleration value exceeds a second boundary value or drops below a third boundary value.

6. The process according to claim 5, which further comprises subsequently using again the calculated transverse acceleration to generate the adjusting signals if the measured transverse acceleration is used to generate the adjusting signals and the absolute value of the difference between the measured transverse acceleration and the calculated transverse acceleration drops below the first boundary value.

7. The process according to claim 5, which further comprises subsequently using a second fixed transverse acceleration value as a transverse acceleration for generating the adjusting signals if the measured transverse acceleration is used to generate the adjusting signals and the absolute value of the difference between the measured transverse acceleration and the calculated transverse acceleration drops below the first boundary value.

8. The process according to claim 7, which further comprises setting the second fixed transverse acceleration value to correspond to a value of the measured transverse acceleration at which the first boundary value is dropped below.

9. The process according to claim 7, which further comprises subsequently using again the measured transverse acceleration to generate the adjusting signals if the second fixed transverse acceleration value is used to generate the adjusting signals and the absolute value of the difference between the calculated transverse acceleration and the measured transverse acceleration exceeds the first boundary value.

10. The process according to claim 7, which further comprises subsequently using the calculated transverse acceleration as the transverse acceleration for generating the adjusting signals if the second fixed transverse acceleration value is used to generate the adjusting signals and an absolute value of the difference between the calculated transverse acceleration and the second fixed transverse acceleration value exceeds a fourth boundary value or drops below a fifth boundary value.

11. The process according to claim 10, which further comprises using the measured transverse acceleration to generate the adjusting signals for the actuators outside of the or of every speed range of the motor vehicle.

12. An apparatus for stabilizing a sway of a motor vehicle, the apparatus comprising:
a first device for one of measuring and calculating a transverse acceleration of the motor vehicle; and
a second device selected from the group consisting of a control apparatus and a regulating apparatus for generating adjusting signals for actuators associated with a front axis and with a rear axis of the motor vehicle on a basis of one of the measured transverse acceleration and the calculated transverse acceleration, the actuators make support moments available on at least one of a front axis and a rear axis for stabilizing the sway, said second device having an apparatus programmed to:
generate adjusting signals for the actuators associated with at least one of a front axis and a rear axis of the motor vehicle on a basis of one of the measured transverse acceleration and the calculated transverse acceleration of the motor vehicle;
use the measured transverse acceleration and the calculated transverse acceleration in at least one speed range of the motor vehicle for generating the adjusting signals for the actuators and one of the calculated transverse acceleration and the measured transverse acceleration is used to generate the adjusting signals in dependence on an absolute value of a difference between the calculated transverse acceleration of the motor vehicle and the measured transverse acceleration of the motor vehicle; and
use the calculated transverse acceleration to generate the adjusting signals if the absolute value of the difference between the calculated transverse acceleration and the measured transverse acceleration is less than a first boundary value.

* * * * *